This invention relates to soldering pastes adapted for use in silver-soldering ferrous and/or non-ferrous metals and alloys by induction or torch heating. It also relates to a novel method for preparing such pastes, particularly for preparing the powdery metallic components of such pastes which yield the ultimate silver solder or brazing metal.

Silver solders have long been known and used for joining ferrous and/or non-ferrous metals, but in the past these solders have been provided in the form of wire, strip or sheet form in which all of the metallic components of the solder are in a fully-alloyed condition. If a different soldering alloy is desired, a whole new formulation is melted, cast, and drawn, rolled or otherwise fabricated into the desired form. Any of such alloys could, of course, be converted by various methods, some of which are laborious and expensive when applied to certain metals, to a powdery form and then added to a suitable vehicle to provide a paste. I have now found, however, a more convenient and more flexible manner for preparing the powdery metallic component(s) of silver-soldering pastes. According to the principles of the present invention, the desired silver-solder composition is prepared directly from the separate metals per se, or from appropriate partial or full pre-alloys of a few of the components by heating to 500–1200° F. a mixture of the separate metals in which at least some are in a particulate form and at least one of which melts within said range of temperatures. The resulting mass, which at these temperatures can be and usually is in a pasty, partly-sintered form, is stirred while it is being heated and also while being cooled; the stirring during cooling causes the mass to solidify in small grains. When the grained mass is cool it can be milled to reduce it to a powdery state appropriate for use in a paste. In some instances it may be desirable to repeat the treatment. By this method of preparation, in which the partial alloy of desired metals is secured at temperatures below the ultimate melting point of the corresponding homogeneous alloy, the resulting powder can contain the correct proportions of metallic components needed directly for the desired solder, or it can be designed to provide a base stock appropriate for being blended with additional powders. The powder so prepared usually is not a homogeneous, fully alloyed material. Nevertheless, when a paste of such non-homogeneous powder or a blend thereof with other metal powders is heated to produce a joint, the desired homogeneous solder or brazing metal is formed readily in situ.

An advantage of the foregoing method of preparing a metallic component for brazing pastes is that one or more of the component metals of the non-homogeneous powders can be used directly in inexpensive lump or other non-powdery form, e.g. mercury, zinc, tin, cadmium, aluminum, lead, gallium, indium, thallium, bismuth, antimony, and alloys of these metals, etc. The resulting non-homogeneous powders can be stocked as base powder. When different solder compositions are desired, various base powders can be mixed with themselves and/or with other easily obtainable metallic powder(s) in whatever proportions are needed. Thus higher-melting materials like copper, brass, bronze, phos-copper, silicon, silver, manganese, nickel, germanium, cobalt, chromium, iridium, rhodium, molybdenum, tungsten, vanadium, columbium, tantalum, titanium, zirconium, hafnium, alkali metals, alkali earth metals, and rare-earth metals, or various other metal powders, alloys or non-homogeneous mixed-metal powders can be blended with one or more of the base powders to give any desired silver-soldering or brazing composition, and the resulting blend can be combined with a vehicle and with appropriate fluxes (when needed) to prepare a paste. In this way a manufacturer of brazing and soldering pastes can easily make up a paste to the customer's specifications without first preparing a fully-alloyed melt of the specified metallic composition.

Accordingly, one object of the present invention is to provide brazing and soldering pastes in which the powdery, metallic components, or some of them, have been at least partially-alloyed without having been melted to a homogeneous condition and without having been heated to the ultimate melting point of the corresponding homogeneous alloy.

Another object is to provide powdery base-products having two or more metals at least partially-alloyed with each other by a treatment in which they have been heated together at temperatures between about 500° F. and 1200° F. while being stirred.

These and other objects will be apparent from the foregoing and following description of the invention.

It will be understood that the fundamental objects of using soldering or brazing metals in the joining of other metals are (a) to avoid the higher temperatures that would be needed to make autogeneous joints and/or melted joints (where two dissimilar metals are being joined), and in the latter instance (b) to provide a joining material which has an affinity for the two different metals which are to be joined, particularly where the latter metals have little affinity for each other or when melted together give a product which is brittle, of low mechanical strength, or of poor chemical or corrosion-resisting properties. Thus while many different considerations may dictate the composition of the joining metal which is to be used for a particular joining task, there is in most instances a compelling object to have a joining metal which can be melted below the melting point of the metal or metals to be joined. In the paste, the achievement of this lower melting quality has been secured heretofore by preparing a fully melted mass of all the components. The components, in many instances, were proportioned so as to produce eutectics or analogous melting point minima (as in non-eutectic systems). The melted mass constituted proof of the lower melting point which the selected proportions induced. After the low melting melt had been secured, along with homogeneity therein, the melt was solidified and fabricated into wire, strip, or sheet, or in some instances was reduced to a powdery state by various methods such as atomization, grinding, etc. One difficulty with following this conventional line of endeavor in preparing powdery joining metals suitable for use in brazing pastes was that many of the known, useful brazing compositions, when in the homogeneous state resulting from melting and subsequent solidification, are very ductile materials and hence are very difficult to reduce to powder by grinding methods. As a solution to this problem, it occurred to me that the preparation of powders suitable for use in brazing pastes could be greatly simplified by abandoning the conventional idea of using only fully pre-alloyed materials. It is known that in numerous binary and ternary metallic systems there are certain proportions which give brittle alloys e.g. 85% copper-15% phosphorous or 50% copper-50% manganese. Such brittle alloys can easily be ground to powder. The powders so secured can then be blended with other metallic components so as to give the desired brazing composition. For instance, if an 8% phosphorous-92% copper brazing powder is desired, the 85% copper-15% phosphorous powder can be blended with additional copper powder so as to cut back the phosphorous content of the mixture to the desired level of 8%. I discovered, by extensive tests, that such blending was effective for its intended purpose, to the end that a paste could be prepared satisfactorily to yield a brazing metal having the desired analysis of 92% copper-8% phosphorous. The blended powders were found to melt satisfactorily at the brazing heat, and when melted were found to possess all of the known attributes of a fully pre-alloyed brazing metal of the composition 92% copper-8% phosphorous. My success in this direction lead to extension of the principles to the easy preparation of silver solder powders and to powders of many other useful brazing and soldering compositions.

Those skilled in the art will recognize that the prior art abounds with teachings of mixing two or more metal powders together in a brazing paste. The present invention goes beyond that idea, however, since by partial pre-alloying of the blend it is possible to overcome the segregation that might easily occur when the powders are not physically bound together. The present invention also stops short of the known methods for binding the powders together; namely by fully pre-alloying them, and then comminuting the solidified melt back to a powdery condition.

The following examples illustrate the ease with which desired brazing metal compositions can be secured without producing a homogeneous alloy of all the metallic components of the composition.

*Example 1*

A partially-alloyed silver solder having an analysis of 35% silver, 25% copper, 20% zinc, and 20% cadmium was prepared by introducing into a crucible 35 grams of −200 mesh silver powder, 40 g. −100 mesh 50% copper-50% zinc brass powder, 5 g. −200 mesh copper powder and 20 g. of cadmium in lump form. A hydrogen atmosphere (−60° F. dew point) was established in and around the crucible to protect the metals from oxidation and then the crucible and contents were heated to about 700° F. The cadmium melted at this temperature, and some sintering of the other metals also was evident. The mass was pasty and while in this condition was stirred to mix it and to keep it in a granular condition. Heating was discontinued, and stirring was continued until the crucible and contents had cooled to about 400° F. This assured that the granular metallic mass would not sinter together when stirring was stopped. When the mass had cooled to about room temperature, it was still in a loose, granular condition. It was ground then in a mill to reduce the particle size to about −80 mesh.

A portion of the resulting powder was made into a paste by mixing 8 grams thereof with 1.9 grams of a mineral oil solution containing about 39% of a high viscosity polybutene (e.g. Caloria 40M, a product of The Penola Oil Co.) and 1 gram of a flux prepared by fusing, solidifying and milling 3 parts of boric anhydride and 2 parts of potassium acid fluoride. A portion of the resulting paste was applied between two pieces of sheet steel, after which the sandwich-type assembly was heated to 1300° F. A sound brazed joint resulted.

The use of polybutene oils as or in a brazing paste vehicle is described and claimed in the copending application Serial No. 593,442, filed June 25, 1956, now Patent No. 2,908,072, the disclosure of which is here incorporated by reference.

*Example 2*

It was desired to prepare a brazing powder like that of Example 1 except to include about 5% of nickel. A portion of the powder prepared as in Example 1 was mixed with the needed quantity of nickel powder produced by reducing NiO with hydrogen at about 600° F., and the mixture was introduced into a crucible protected with a non-oxidizing atmosphere. The crucible and contents were heated to about 800° F. and the contents were stirred and then cooled while being stirred. The resulting granular mass was subsequently ground in a mill to −80 mesh.

*Example 3*

In the same manner as described in Example 2, the powder of Example 1 was modified to include 5% manganese, this element being introduced in the needed quantity in the form of −325 mesh manganese powder.

An alternative procedure would utilize the alloys described in Examples 1 and 5. For example, 10 grams of the alloy prepared in Example 5 and ground to a −325 mesh size could be simply mixed with the alloy described in Example 1 and thereby rendered suitable for brazing purposes. The oxidation tendency of the manganese, being alloyed with equal amounts of copper, would be greatly diminished thus permitting a simple mixture for brazing purposes.

*Example 4*

50 grams of copper powder, 40 grams of tin powder and 10 grams of silicon powder (all −325 mesh) were heated in a stationary bed at 1200° F. under −60° F. dew point hydrogen atmosphere for one hour and cooled in the same atmosphere. The powder was then pulverized and examined under 40-power binoculars and to all appearances was totally alloyed.

*Example 5*

Equal amounts of −325 mesh copper and manganese powders were heated at 1100° F. in a stationary bed for one hour under a −60° F. dew point hydrogen atmosphere. After cooling in the same atmosphere, the powder was easily pulverized. When examined under 40-power binoculars it appeared that total alloying had been effected.

*Example 6*

A partially alloyed silver solder, having an analysis of 50% silver, 21% copper, 19% zinc and 5% tin, and conforming to ASTM-AWS Specification BAg-7, was prepared by introducing into a crucible 50 grams of −200 mesh silver powder, 40 grams of −100 mesh 50% copper-50% zinc brass powder, 5 grams of −100 mesh tin powder and 5 grams of −200 mesh copper powder. A hydrogen atmosphere (−60° F. dew point) was established in and around the crucible to protect the metals from oxidation and then the crucible and contents were heated to about 700° F. The tin melted at this temperature, and some sintering of the other metals also was evident. The mass was pasty and while in this condition was stirred to mix it and to keep it in a granular condition. Heating was discontinued, and stirring was continued until the crucible and contents had cooled to about 400° F. This assured that the granular metallic mass would not sinter together when stirring was stopped. When the mass had cooled to about room temperature, it was still in a loose, granular condition. It was ground then in a mill to reduce the particle size to about −80 mesh.

*Example 7*

Consider, for example, the SAE Specification designated CuBase D having the analysis 94.8% copper minimum, 1.5% zinc maximum, 0.75% tin maximum, 1.6% iron maximum, 2.75-3.5% silicon and 1.5% manganese maximum. An adequately partially alloyed powder of this composition can be prepared in the following manner:

5 grams of copper, 5 grams of zinc, 5 grams of tin, 5 grams of iron, 30 grams of silicon and 5 grams of manganese powders (all —325 mesh) are heated in a stationary bed at 1200° F. under —60° F. dew point hydrogen atmosphere for one hour and cooled in the same atmosphere. The powder is then pulverized and added to 945 grams of —325 mesh copper powder and re-sintered under the above specified conditions. Again it is cooled, pulverized and thereby made ready for brazing purposes.

*Example 8*

Consider, also, the ASTM-AWS Specification designated BAgMn for a brazing alloy having the composition of 84–86% silver and 14–16% manganese. This chemical analysis can be produced according to the method set forth in Example 5. The procedure would be as follows:

Equal amounts of —325 mesh silver and manganese powders are heated at 1100° F. in a stationary bed for one hour under a —60° F. dew point hydrogen atmosphere. After cooling in the same atmosphere, the powder is pulverized and a blend consisting of 30% of this powder and 70% of —325 mesh copper powder is reprocessed according to the above description.

The resultant powder is sufficiently alloyed to function as a brazing alloy. One might question the need for this procedure in view of the fact that manganese is very brittle and can be reduced to —325 mesh by milling, in which case it would appear that a suitable alloy powder could be formulated by simply mixing 85% silver and 15% manganese —325 mesh powders. The sintering procedure which is described above would be preferred because the manganese, being first alloyed with the silver, would be much less subject to oxidation under brazing conditions.

*Example 9*

Following is a table of the American Welding Society's Specifications for various silver solder compositions:

| Filler Metal Classification | Ag | Cu | Zn | Cd | Ni |
|---|---|---|---|---|---|
| 1 | 45 | 15 | 16 | 24 | |
| 1A | 50 | 15.5 | 16.5 | 18 | |
| 2 | 35 | 26 | 21 | 18 | |
| 3 | 50 | 15.5 | 15.5 | 16 | 3 |
| 4 | 40 | 30 | 28 | | 2 |
| 5 | 45 | 30 | 25 | | |
| 6 | 50 | 34 | 16 | | |
| 9 | 65 | 20 | 15 | | |
| 10 | 70 | 20 | 10 | | |
| 11 | 75 | 22 | 3 | | |

To prepare these compositions, a basic alloy powder consisting of 27.3% copper, 29.1% zinc and 43.6% cadmium is first made up in the following manner:

27.3 pounds of copper powder is placed into a rotary horizontal drum with lifters and subjected to vigorous agitation and heated to 800° F. under the influence of a —60° F. dew point hydrogen atmosphere. Bar zinc and cadmium are gradually added to the mixer at a sufficiently slow rate to prevent massive agglomeration. The ultimate granular mass can be reduced to —200 mesh powder by milling. This alloy then serves as a basic material for formulating all the alloys in the specifications cited above.

The Type 1 composition consisting of 45% silver, 15% copper, 16% zinc, 24% cadmium can be produced by mixing 45% of a —200 mesh silver powder with 55% of the basic alloy powder.

The Type 2 composition can be produced by mixing 35.00 grams silver, 17.95 grams 50–50 brass, 5.75 grams copper, 41.30 grams of the basic alloy. To assure a minimum of segregation, all of the powders should be —200 mesh.

In like manner, all the silver solder compositions described in the table can be produced by blending varying amounts of four basic —200 mesh powders, which are silver, 50–50 brass, copper, and the basic 27.3% copper, 29.1% zinc, 43.6% cadmium alloy and, in addition, in the case of Types 3 and 4, nickel powder.

*Example 10*

Two basic alloy powders are prepared in the following manner:

(A) 85 pounds of mossy or bar zinc and 15 pounds of copper powder (all powders passing a 40-mesh screen will suffice) are placed in a rotary horizontal drum with lifters and subjected to vigorous agitation and heated to 800° F. under the influence of a —60° F. dew point hydrogen atmosphere. The agglomerated mass is cooled under the same atmosphere and pulverized to the desired screen size either in a ball or hammer mill.

(B) An alloy consisting of 85% cadmium and 15% copper is prepared in a manner identical to A.

Alloys A and B can be blended with silver and copper powders to prepare silver solder powder mixtures such as classifications 1, 1A or 2. Consider Type 2 consisting of 35% silver, 26% copper, 21% zinc and 18% cadmium. This composition can be effected by blending —200 mesh powders consisting of 35% silver, 19.1% copper, 24.7% 85-15 zinc-copper alloy and 21.2% 85-15 cadmium-copper alloy. Although we do not regard it as being essential, at least in some cases this composition could be virtually totally alloyed by heating the blended powders at 800° F. under the influence of —60° F. dew point hydrogen.

Having described my invention, what I claim is:

1. The method of preparing powdered silver-solder compositions composed by weight of 35–75% silver, 15–34% copper, 3–28% zinc and as optional components 16–24% cadmium and 2–3% nickel, which powdered compositions are particularly adapted for use in preparing silver-solder soldering pastes, said method comprising the steps of: preparing a first base powder composed of about 85% zinc, balance copper by agitating a mixture of the needed copper in powder form, with the needed zinc in any form while heating the mixture in a protective atmosphere to melt the zinc, followed by continuously agitating the resulting mass of copper and molten zinc in said protective atmosphere while cooling it at least to a temperature at which it will thereafter retain the granular state imparted to it by said continuous agitation, and then grinding said granular material to a powdery condition; separately preparing a second base powder composed of about 85% cadmium, balance copper by agitating a mixture of the needed copper in powdered form with the needed cadmium in any form while heating the mixture in a protective atmosphere to melt the cadmium, followed by continuously agitating the resulting mass of copper and molten cadmium in said protective atmosphere while cooling it at least to a temperature at which it will thereafter retain the granular state imparted to it by said continuous agitation, and then grinding said granular material to a powdery condition; separately preparing a third base powder composed of about 27% copper, 29% zinc, balance cadmium, by agitating a mixture of the needed copper in powdered form with the needed cadmium and zinc in any form while heating the mixture in a protective atmosphere to melt the cadmium and zinc, followed by continuously agitating the resulting mass of copper and molten cadmium and zinc in said protective atmosphere while cooling it at least to a temperature at which it will thereafter retain the granular state imparted to it by said continuous agitation, and then grinding said granular material to a powdery condition; mixing at least portions of one of said base powders with other metal powders selected from the group consisting of the others of said base powders, silver powder, nickel powder, copper powder, 50% copper/50% zinc brass powder and mixtures thereof in such proportions as are needed to give a powdery mixture having a chemical analysis within the limits set forth hereinabove.

2. The method as claimed in claim 1 wherein said base powder and said other metal powders have a particle size below about 200 mesh.

3. The method of preparing powdered silver-solder compositions composed by weight of 35–75% silver, 15–34% copper, 3–28% zinc and as optional components 16–24% cadmium and 2–3% nickel, which powdered compositions are particularly adapted for use in preparing silver-solder soldering pastes, said method comprising the steps of: preparing a base powder composed of about 27% copper, 29% zinc, balance cadmium, by agitating a mixture of the needed copper in powdered form with the needed cadmium and zinc in any form while heating the mixture in a protective atmosphere to melt the cadmium and zinc, followed by continuously agitating the resulting mass of copper and molten cadmium and zinc while cooling it at least to a temperature at which it will thereafter retain the granular state imparted to it by said continuous agitation, and then grinding said granular material to a powdery condition; mixing at least portions of said base powder with other metal powders selected from the group consisting of silver powder, nickel powder, copper powder, 50% copper/50% zinc brass powder, and mixtures thereof in such proportions as are needed to give a powdery mixture having a chemical analysis within the limits set forth hereinabove.

4. The method of preparing powdered silver-solder compositions composed by weight of 35–75% silver, 15–34% of copper, 3–28% zinc and as optional components 16–24% cadmium and 2–3% nickel, which powdered compositions are particularly adapted for use in preparing silver-solder soldering pastes, said method comprising the steps of: preparing a first base powder composed of about 85% zinc, balance copper by agitating a mixture of the needed copper in powdered form with the needed zinc in any form while heating the mixture in a protective atmosphere to melt the zinc followed by continuously agitating the resulting mass of copper and molten zinc in said protective atmosphere, while cooling it at least to a temperature at which it will thereafter retain the granular state imparted to it by said continuous agitation, and then grinding said granular material to a powdery condition; separately preparing a second base powder composed of about 85% cadmium, balance copper by agitating a mixture of the needed copper in powdered form with the needed cadmium in any form while heating the mixture in in a protective atmosphere to melt the cadmium, followed by continuously agitating the resulting mass of copper and molten cadmium in said protective atmosphere while cooling it at least to a temperature at which it will thereafter retain the granular state imparted to it by said continuous agitation, and then grinding said granular particles to a powdery condition; mixing at least portions of said first base powder with other metal powders selected from the grouping consisting of: said second base powder, silver powders, copper powder, nickel powder and mixtures thereof in such proportions as are needed to give a powdery mixture having a chemical analysis within the limits set forth hereinabove.

5. The method of preparing silver solders in a powdery condition suitable for use in brazing pastes, said powdery silver-solders being composed by weight of 35–75% silver, 15–34% copper, 3–28% zinc and as optional components 16–24% cadmium and 2–3% nickel, said method comprising the steps of: mixing in a crucible (a) powdery particles of metallic material melting above about 1200° F. selected from the group consisting of silver, copper, nickel and 50% copper/50% zinc brass alloy, and (b) small lumps of at least one metal melting below about 1200° F. selected from the group consisting of cadmium and zinc; heating said mixture under a protective atmosphere to a temperature between about 500° and 1200° F. to cause the melting of at least a part of the mixture and stirring said heated mass until the meltable components of part (b) above have been melted and disseminated through the mass; then allowing the mass to cool while continuing to stir it, thereby to keep it in a grainy condition; mechanically comminuting the grainy mass to a powdery condition; and finally blending the powdery material with any other metallic powders needed to bring said comminuted mass to a desired chemical analysis within the limits set forth hereinabove.

References Cited in the file of this patent

UNITED STATES PATENTS

| Number | Name | Date |
| --- | --- | --- |
| 304,500 | Canda | Sept. 2, 1884 |
| 1,899,701 | Leach | Feb. 28, 1933 |
| 2,259,078 | Muller et al. | Oct. 14, 1941 |
| 2,273,832 | Carney | Feb. 24, 1942 |
| 2,286,237 | Shaw et al. | June 16, 1942 |
| 2,725,287 | Cronin | Nov. 29, 1955 |
| 2,837,425 | Vordahl | June 3, 1958 |

OTHER REFERENCES

Butts: "Copper, the Metal, Its Alloys and Compounds," 1954, pages 458–9, 467–8 and 485–6; published by Reinhold Publishing Corp., New York, N.Y.